Aug. 30, 1966 PUI KUM LEE 3,270,194

LIGHT EXPOSURE APPARATUS

Filed June 24, 1964

INVENTOR.
PUI KUM LEE
BY
Carpenter, Abbott, Coulter & Kinney
ATTORNEYS

United States Patent Office 3,270,194

Patented August 30, 1966

3,270,194

LIGHT EXPOSURE APPARATUS

Pui Kum Lee, White Bear Lake Township, Ramsey County, Minn., assignor to Minnesota Mining and Manufacturing Company, St. Paul, Minn., a corporation of Delaware Filed June 24, 1964, Ser. No. 377,750
7 Claims. (Cl. 240—20)

This invention relates to light-exposure apparatus having particular utility in the art of photocopying.

Accurate reproduction of printed documents and other originals by methods involving exposure to light of a light-sensitive sheet material in contact with the original require that the sheet be uniformly illuminated. For high speed processes a high intensity of illumination is desirable. Light-boxes containing a large number of equally spaced incandescent-filament lamps within a light-reflective casing having a light-diffusing cover have been found useful in such applications but are found to possess a number of disadvantages. Operated under overload conditions at high intensity, the lamps have a short working life and require frequent replacement. Proper balance of the several lamps is difficult to maintain. On the other hand, light-boxes containing fewer sources have generally required much greater distances, and additional screens or light-diffusion panels, between the source and the exposure area in order to provide the desired uniformity of illumination.

The light-box of the present invention employs but a single light source and in close proximity to the exposure area, while permitting not more than about plus or minus five percent variation in illumination intensity over the entire area. Intensity of illumination is high so that short exposure times may be used. Excessive and localized temperature buildup at the exposure area is avoided. The invention accordingly makes available a surprisingly shallow light-box with which completely uniform rapid safe exposure of full business correspondence size photosensitive copy-sheet materials may be accomplished.

Figure 1:
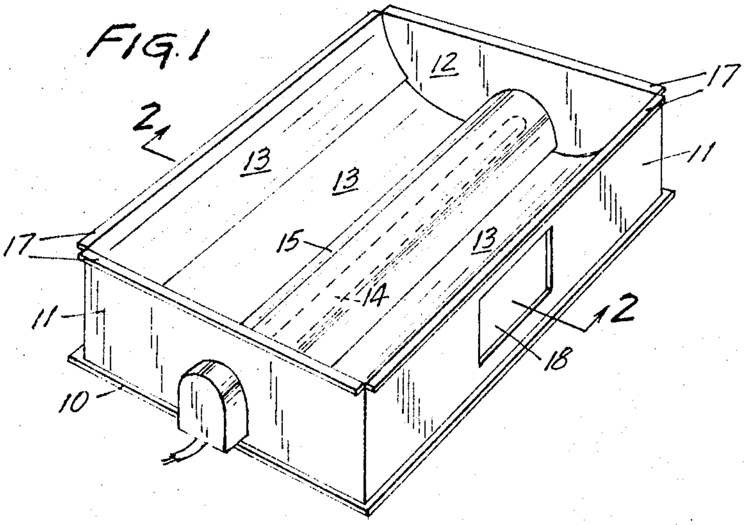
FIGURE 1 is a view in perspective, and approximately to scale, of a preferred exemplary embodiment of the light-box of the present invention, with cover removed to show the interior construction.
Figure 2:
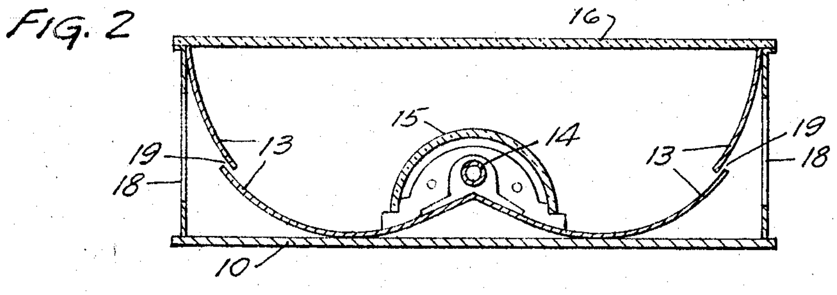
FIGURE 2 is a diagram of the cross-section of the light-box taken at plane 2—2 of FIGURE 1.

The apparatus of FIGURES 1 and 2 comprises generally a base 10 to which is attached a shallow framework 11 enclosing flat end reflectors 12, curved side reflectors 13, tubular lamp 14, and shield 15. A light-transmitting work-support panel 16, shown in section in FIGURE 2, rests on the flanged upper edges 17 of the frame defining the exposure area.

Figure 3:
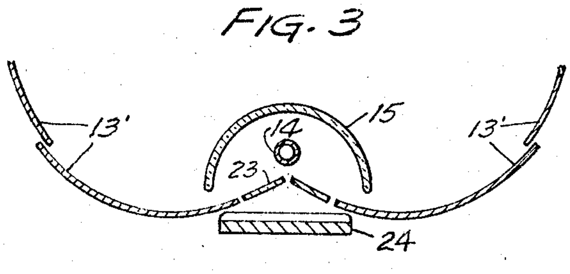
FIGURE 3 is a detail, also in cross-section, of a portion of the lamp and reflector assembly of a modified form of the light-box.

The modification illustrated in FIGURE 3 substitutes a pair of narrow flat specular reflectors 23 for the inner curved edge areas of the reflectors 13′, and includes a radiation-absorptive heat-conductive radiator 24 therebelow.

In a specific example the light-box is required to be capable of exposing uniformly a photosensitive copy-sheet measuring 8½ x 14 inches and to have an over-all depth not greater than about 3½ inches. To meet these requirements, the structure illustrated in FIGURE 1 modified as shown in FIGURE 3 is employed.

The open top of the frame, i.e. the optically effective area of the glass plate serving as the support 16 and of the exposure area, measures 8¾ x 14½ inches. The depth of the frame 11 and support 16 is 3¼ inches, the maximum distance between support and reflector being 2⅞ inches.

The lamp is a GE "Q1250T3/i/432" supported segmented-coil line filament iodine vapor quartz envelope lamp having an over-all length of approximately 16½ inches and an external diameter of about ⅜ inch, and is centered along a line two inches beneath the inner surface of the support 16. Direct illumination will therefore be seen to strike the edges of the support panel at an angle, measured from the normal, of somewhat more than 60 degrees.

The end reflectors 12 are parallel polished aluminum plates. The shield 15 is a semicylindrical glass trough having an outside diameter of 2½ inches. The glass is about one-twelfth inch thick. The uppermost portion is 1¼ inches below the inner surface of the support 16, and the edges come to within about ⅛ inch of the reflector 13.

The specular reflectors 23 are each ¾ inch wide and are made of partially silvered glass. They are spaced slightly apart, forming a flat open inverted V having a total width of 1½ inches. The vertex is about ⅛ inch beneath the lamp 14.

The reflectors 13 approach closely to an arcuate shape, the narrow upper segment of the arc being inwardly displaced to form a ventilating slot 19. The center of the arc lies on the perpendicular bisector of a line connecting the position of the filament and the effective edge of the exposure area. The reflectors 13 are coated with a non-glossy diffuse-reflecting white paint.

The radiator 24 consists of a thin laterally fluted metal casting having a radiation-absorptive non-glossy surface, spaced about ⅛ inch beneath the open side of the inverted V. The width of the radiator is two inches.

A fan, not shown, forces air into the apparatus through an opening 18 at one side of the frame. Much of the air passes through the slot 19 in the reflector 13 where it is directed along the reflector surface to the shield 15. A portion then enters beneath the shield and another portion is directed upwardly and over the shield; and the heated air is then exhausted through the opposite slot 19 and opening 18. The specular reflectors 23 reflect visible light but transmit a large proportion of the incident heat-producing infra-red rays which are then absorbed in the radiator 24, where a heating effect is produced. The radiator and the outer surfaces of the reflectors 13 are cooled by another portion of the air entering through the opening 18. As a result, it is found possible to carry out any desired number of successive exposures without accumulating any excess heat and with a complete absence of "hot spots" at the exposure area. The full output of the lamp is effectively utilized, and the intensity of illumination is constant over the entire area.

An effective test procedure for a light source of the kind here described involves the exposure of a photosensitive sheet material in reflex-exposure contact with a sheet of cross-ruled graph paper as a graphic original. The entire original is ruled in quater-inch squares with lines of faint blue-green ink. The sensitive sheet may contain a desensitizable reactant such as methoxyhydroxynaphthalene and a photoreducible dye such as erythrosin, as described for example in Workman U.S. Patent No. 3,094,417. After brief exposure the sheet is placed in contact with a receptor sheet containing a reducible silver soap and the composite is heated. An image of the ruled lines of the original is created in the receptor sheet. With any but substantially completely uniform illumination, the image fails to appear at over-exposed areas or is accompanied with heavy backgrounding at under-exposed areas. Exposure in the apparatus here described results in a clear uniform reproduction of the inked pattern, with no observable skipping or backgrounding over the entire area.

For copying purposes as just described it is necessary to maintain good uniform contact between original and photosensitive sheet during light-exposure. Contact may be achieved by means of a pressure platen biased toward the support platen 16. An alternative method involves replacing the flat platen 16 with a slightly arcuate support, over which the composite of sheets may be held in close contact by tension applied at their edges.

Figure 4:
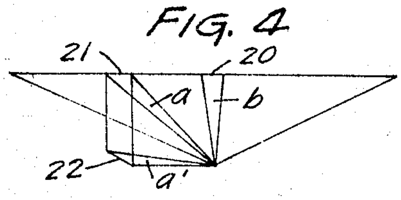
FIGURE 4 is a graphical illustration of a method of constructing a suitable reflector member.

Although the reflectors 13 are generally arcuate as previously noted, some deviation from constant radius of curvature is sometimes necessary in obtaining the desired degree of uniformity of illumination at the exposure surface. A convenient method of deriving the required curve is illustrated in FIGURE 4 as applied to a light source having an infinite effective length, a completely diffus-reflecting reflector surface, and a depth and width such that lines connecting the light source and the edges of the exposure area embrace an angle not greater than about 120 degrees.

The width of the exposure surface is first divided into equal small segments. Since maximum illumination by direct rays from the source is achieved directly over the source, i.e. at segment 20, it is convenient to employ the intensity at this segment as a standard. Illumination at any segment may be considered as derived from rays received in a direct line from the source and those received from an intermediate reflecting surface which is directly illuminated from the source. The total intensity is then the sum of the two and may be taken as equivalent to the sum of the angles subtended by the surfaces under direct illumination. Thus in FIGURE 4 the segment 20 subtends the angle *b*. Another equal 21 subtends the smaller angle *a*, and this segment is therefore to be provided with additional illmination equivalent to angle $a'$, where $a+a'=b$. The segment 22 of a reflector 13 is so placed as to direct the light of angle $a'$ to the segment 21. By thus progressively determining the required angle of each successive segment of the reflector surface, the entire luminous output of the source 14 is properly allocated and the required substantially complete uniformity of illumination is obtained at the exposure area.

Somewhat similar methods are helpful in devising reflectors with other than fully diffuse-reflecting surfaces, or for use with sources of less than complete uniformity, or to care for other deviations. In all cases the reflector is so shaped as to direct to each unit area of the exposure surface an amount of light which complements the amount made available at the same unit area by direct or straight-line radiation. Expressed mathematically, $E_d+E_i=K$, whre $E_d$ and $E_i$ represent intensity of illumination by direct rays and indirect or reflected rays respectively, and K is a constant.

The substitution of the narrow flat reflectors 23 for the corresponding edge areas of the reflectors 13 of FIGURE 1 aids in reducing the heating effect, as already described. In addition these reflectors permit further increase in width, or decrease in depth, of the light-box while still maintaining a high degree of uniformity of light at the exposure area. The reflectors 23 are so positioned as to throw additional light along the outer side edges of the exposure area. At an angle of about 120 degrees of direct illumination, uniform illumination may be achieved without resort to the reflectors 23, the latter when used then serving primarily to decrease the heating effect. Increasing the angle of direct illumination to 140 degrees or thereabouts requires additional reflection to the edge areas and the specular reflectors 23 must then be included.

Figure 6:
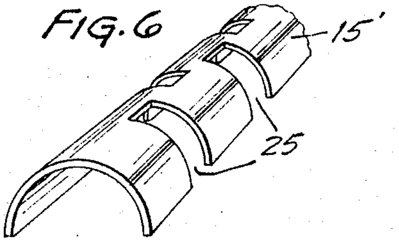
FIGURE 6 is a partial representation in perspective of an alternative form of shield member.

In order to achieve uniform illumination over an angle of 140 degrees and with concomitant minimum depth of apparatus it is also found desirable to employ a partially reflecting shield, e.g. as illustrated in FIGURE 6. Such a shield may consist of an alternately oppositely slotted semicyclindrical inverted polished aluminum reflective trough 15' fashioned with staggered slots 25 lying along both sides of a common base line and being spaced a distance equal to their common widths as shown. Substitution of the slotted reflective shield 15' for the transparent shield 15 reduces the intensity of the illumination obtained along the central portion of the exposure area, and increases the amount of light available to the remaining areas by radiation, so that the width of the exposure area may be increased to as much as four times the depth of the apparatus; whereas with the transparent shield a width to depth ratio of not more than about 3, or perhaps 3½ may be attained in apparatus capable of uniformity of illumination to within about plus or minus five percent.

Uniformly partially reflecting light-transmitting shields, e.g. of partially silvered glass, are also useful where maximum width-to-depth ratio is desired.

Figure 5:
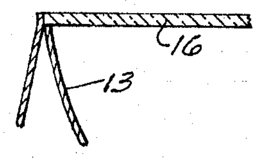
FIGURE 5 is a partial section of an alternative work-support structure detail.

As described, the apparatus is particularly applicable as an exposure box for contact printing of single page printed documents and the like. For copying from books it is found desirable to eliminate the flange 17 along one side and to bring the edge of the panel 16 in line with the outer edge of the reflector 13, as in FIGURE 5.

The description has been given for convenience in terms of exposure in an upward direction, so that papers or books to be copied may be laid, with the associated photosensitive copy-sheet or intermediate sheet, on the supporting panel. It will be appreciated that identical optical results may be obtained with the box tilted in any direction, or inverted. For example, the material to be copied may be laid on a supporting pad or surface such as a desk top, and the apparatus in inverted position and without the supporting panel 16 then placed over it for the exposure step. It will also be apparent that the apparatus here described, or some non-inventive modification, may have application in fields other than photocopying and wherever a compact source of uniform and intense illumination is desired.

What is claimed is as follows:

1. A compact source of uniform intense wide-area illumination adapted for exposure of light-sensitive sheet material in contact with a graphic original at an exposure area and comprising: a line source of high intensity light extending between two opposed reflectors adjacent the ends of said exposure area, said line source being centrally disposed beneath the exposure area at a short distance such that the angle of direct illumination is not greater than about 140 degrees; an at least partially light-transmissive shield closely overlying said line source and spaced therefrom to provide a narrow space around said lamp for controlled passage of air; and a pair of generally arcuate reflectors each extending from just beneath said line source to the corresponding side edge of said exposure area and each being generally centered on a point lying on the perpendicular bisector of a line connecting said line source and said side edge; the said exposure source being further characterized as substantially fulfilling the requirement indicated by the equation $E_d+E_i=K$, where $E_d$ and $E_i$ represent intensity of illumination by direct rays and indirect or reflected rays respectively, and K is a constant.

2. An exposure source as defined in claim 1 in which the arcuate reflectors each include segments separated and overlapped to provide therebetween longitudinal channels for passage of air.

3. An exposure source as defined in claim 2 in which the arcuate reflectors are diffusely light-reflecting and the light-transmissive shield is a glass half-cylinder.

4. An exposure source as defined in claim 2 in which the arcuate reflectors are diffusely light-reflecting and the light-transmissive shield is a slotted reflective metallic half-cylinder.

5. An exposure source as defined in claim 1 in which the distance of the line source of light beneath the exposure area is such that the angle of direct illumination is not greater than about 120 degrees.

6. A compact source of uniform intense wide-area illumination adapted for exposure of light-sensitive sheet material in contact with a graphic original at an exposure area and comprising: a high intensity segmentally coiled line filament lamp extending between and perpendicular to two parallel specular reflectors adjacent the two ends of said exposure area to provide in effect a uniform light source of infinite length, said lamp being centrally disposed beneath the exposure area at a short distance such that the angle of direct illumination is not greater than about 140 degrees; a light-transmissive glass shield closely overlying said lamp and spaced therefrom to provide a narrow space around said lamp for controlled passage of air; a pair of narrow flat specular reflectors disposed directly beneath said lamp at an angle such that light from said lamp falling directly on a said reflector is reflected to a narrow zone adjacent the corresponding side edge of said exposure area; and a pair of generally arcuate diffusely reflecting reflectors, each including segments separated and overlapped to provide longitudinal channels for passage of air, extending from adjacent a corresponding edge of a said narrow reflector to a corresponding side edge of said exposure area, the arcuate reflector being generally centered on a point lying on the perpendicular bisector of a line connecting said lamp and said side edge; the said exposure source being further characterized as substantially fulfilling the requirement indicated by the equation $E_d+E_i=K$, where $E_d$ and $E_i$ represent intensity of illumination by direct rays and indirect or reflected rays respectively, and K is a constant.

7. A source as defined in claim 6 in which the specular reflectors beneath the lamp are transmissive of infra-red radiation, and including beneath said reflectors an infra-red-absorptive heat-conductive element spaced from said reflectors to permit passage of air.

References Cited by the Examiner

UNITED STATES PATENTS

| | | | |
|---|---|---|---|
| 3,021,422 | 2/1962 | Ogier et al. | 240—11.4 X |
| 3,152,765 | 10/1964 | Wohlers | 240—11.4 X |

NORTON ANSHER, *Primary Examiner.*